US007652237B2

(12) United States Patent
Schulz

(10) Patent No.: US 7,652,237 B2
(45) Date of Patent: Jan. 26, 2010

(54) COLOR POINT CONTROL SYSTEM FOR LED LIGHTING AND RELATED METHODS

(75) Inventor: Volkmar Schulz, Stolberg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 32 days.

(21) Appl. No.: 11/995,347

(22) PCT Filed: Jul. 5, 2006

(86) PCT No.: PCT/IB2006/052259

§ 371 (c)(1),
(2), (4) Date: Jan. 11, 2008

(87) PCT Pub. No.: WO2007/007238

PCT Pub. Date: Jan. 18, 2007

(65) Prior Publication Data

US 2008/0217512 A1 Sep. 11, 2008

(30) Foreign Application Priority Data

Jul. 14, 2005 (EP) ................................. 05106447

(51) Int. Cl.
*G01J 1/14* (2006.01)

(52) U.S. Cl. ....................................... 250/205; 362/231

(58) Field of Classification Search ................. 250/205; 362/231, 19, 230, 235, 236, 257, 293, 313, 362/327
See application file for complete search history.

(56) References Cited

U.S. PATENT DOCUMENTS 6,411,046 B1 6/2002 Muthu
6,452,217 B1 9/2002 Wojnarowski et al.
6,495,964 B1 12/2002 Muthu et al.
6,552,495 B1 4/2003 Chang
6,635,987 B1 10/2003 Wojnarowski et al.
6,726,341 B2 4/2004 Pashley et al.
7,135,664 B2 * 11/2006 Vornsand et al. ............ 250/205
7,350,933 B2 * 4/2008 Ng et al. ........................ 362/84
7,503,706 B2 * 3/2009 Wipiejewski et al. ......... 385/89
2002/0047624 A1 4/2002 Stam et al.
2004/0052076 A1 * 3/2004 Mueller et al. .............. 362/293
2005/0063185 A1 3/2005 Monjo et al.

FOREIGN PATENT DOCUMENTS

GB 2433837 A 7/2007
WO 03032689 A1 4/2003
WO 2005022030 A2 3/2005

* cited by examiner

*Primary Examiner*—Georgia Y Epps
*Assistant Examiner*—Tony Ko

(57) ABSTRACT

Color point control system (1) comprising a LED device (2) comprising a plurality of light-emitting diodes (3*a*,3*b*,3*c*,3*d*) emitting a first light, said diodes (3*a*,3*b*,3*c*,3*d*) fixed on a substrate (4), a layer (5) on at least one light-emitting diode (3*a*,3*b*,3*c*,3*d*) capable to convert at least a first portion of the first light into a second light, only one photo-sensor (6) for measuring a second portion of the first light of each single diode (3*a*,3*b*,3*c*,3*d*) during a turn-off time where all other diodes are turned-off, and a controller (9) for sequentially turning-off said diodes (3*a*,3*b*,3*c*,3*d*) except one single diode (3*a*, 3*b*, 3*c*, 3*d*) and for comparing the second portion of the first light of each single diode (3*a*,3*b*,3*c*,3*d*) measured by the photo-detector (6) to a default value and to adapt the emitted second portion of first light of each single diode (3*a*,3*b*,3*c*,3*d*) to said default value.

10 Claims, 3 Drawing Sheets

COLOR POINT CONTROL SYSTEM FOR LED LIGHTING AND RELATED METHODS

Figure 1:
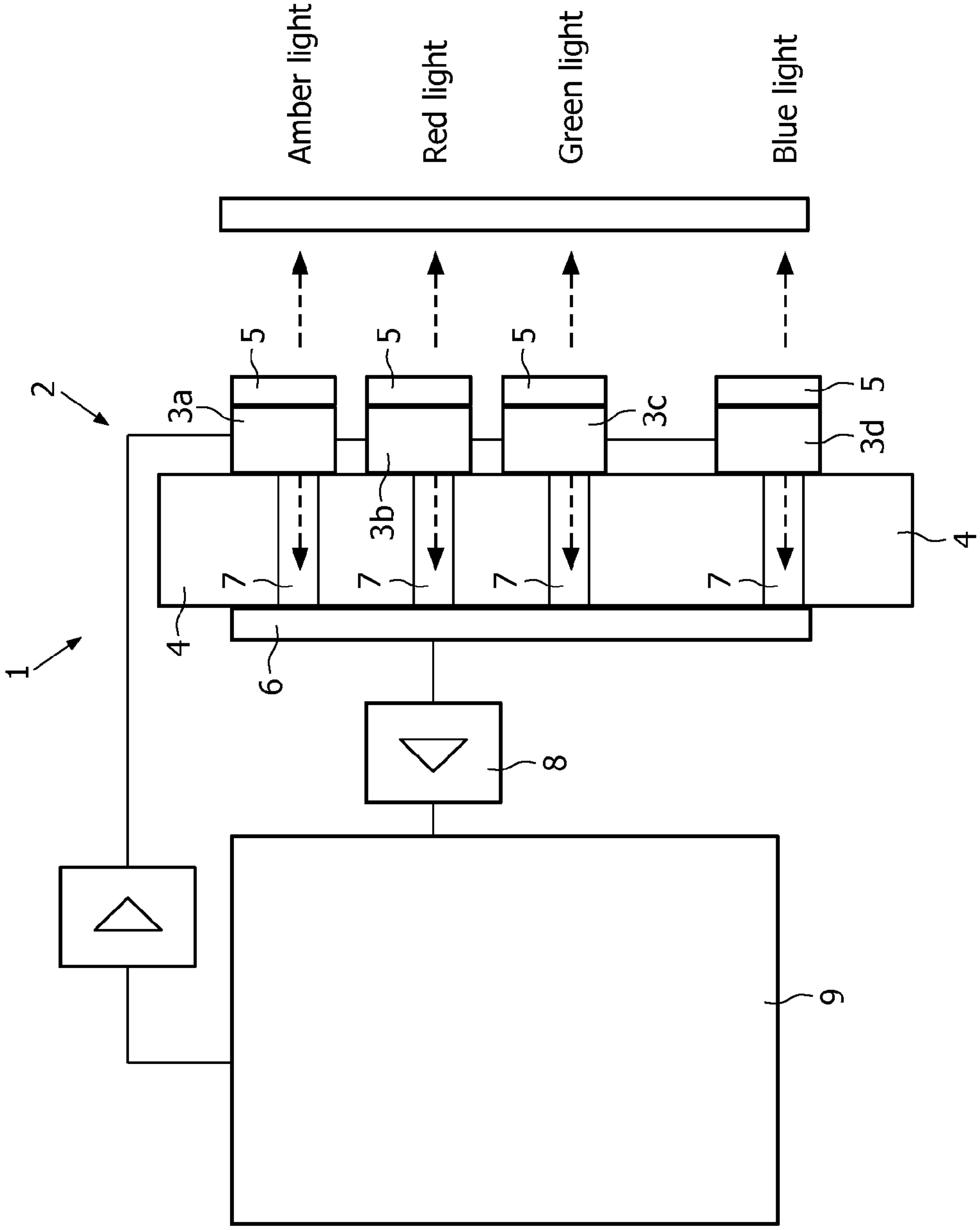

The invention relates to colour point control system of a LED device and to a method for controlling the colour point.

It is known that in order to design a lighting system producing a wide range of colours, LEDs with different colours are used. These LEDs define an area in the CIE xy-colour-space, which shows the colour that can be realized by the weighted linear combination of these LEDs (e.g. red(R), green(G) and blue(B)). In future high-power LEDs, the dissipated power will lead to a temperature increase of the dies close to 200° C. For this temperature, the emission spectrum of the LEDs shifts due to thermal degradation of the emitting properties in an unacceptable way. One of the disadvantages is that the shift is noticed via the human eyes.

Red and green LEDs, which are made of blue LEDs with a phosphor-ceramic layer on the top of the dies, are known. Nevertheless, the intensity is still a function of temperature, driving current and lifetime. The intensity of an array of light-emitting diodes (LEDs) each emitting the same colour of light would be sufficiently controlled with a photo sensor regardless of temperature dependent lifetime effects of the sensor. In case of coloured light mixed from light sources with different colours, one faces the problem that the human eye is very sensitive of colour point variation originated from small intensity variations of the individual light sources. It is known to use RGB-sensors in order to control the colour point. One of the basic problems of current colour point control systems is that the sensor for colour sensing has to fit the CIE-colour-matching-functions. There are several commercial RGB-sensors available, that claim to be close to the CIE-colour-matching-functions, but none of these is sufficiently suitable for the colour control task. Additionally these sensors are currently expensive. Another disadvantage of the known colour point control systems is that the spectral sensitivity of the sensors has to be independent of the temperature, which is not the case for normal photo-diodes. These sensors are specified for temperature ranges up to e.g. 85° C., which is far below the operating temperature of high power LEDs.

The invention has for its object to eliminate the above-mentioned disadvantages. In particular, it is an object of the invention to provide a colour point control system with a cheap and simple setup, which is essentially temperature independent.

This object is achieved by a colour point control system as taught by claim 1 of the present invention.

Accordingly, a colour point control system is provided, comprising a LED device comprising a plurality of light-emitting diodes emitting a first light, said diodes fixed on a substrate, a layer on at least one light-emitting diode capable to convert at least a first portion of the first light into a second light, only one photo-sensor for measuring a second portion of the first light of each single diode during a turn-off time where all other diodes are turned-off, and a controller for sequentially turning-off said diodes except one single diode and for comparing the second portion of the first light of each single diode measured by the photo-detector to a default value and to adapt the emitted second portion of first light of each single diode to said default value. Preferably, the first light is emitted to the photo-sensor without passing the layer. In another embodiment the light-emitting diode comprises an array of two or more sub-diodes.

Preferably, the first light is visible light. The first light can be converted by the layer into other visible light with a longer wavelength. According to another embodiment the first light can be ultra violet light. For instance the first light of the light-emitting diodes can have wavelength between 420 and 470 nm (blue first light). In one embodiment, the blue violet light is converted by the layer into red, green or amber second light.

Alternatively, in another embodiment of the invention the first light is ultra violet light with wavelengths between 300 and 420 nm (ultra violet first light). The ultra violet light is converted by the layer into like red, green, blue or amber second light. Furthermore, the invention comprises light-emitting diodes with the layer, which converts at least the portion of the first blue visible light into a different visible light.

According to a preferred embodiment of the present invention the LED device consists of n diodes emitting blue light and n−1 diodes with a layer converting the blue light into other required colours. Each of the diodes is separately driven by a single driver-line. The converted light is leaving the LED device at one side. The preferred colour point control system is built up in such a way, that some of the blue first light (second portion of the first light) is directly radiated to the photo-sensor. Advantageously, the photo-sensor is a silicon-sensor. Of course, further known photo-sensors are clearly conceivable. A part (second part) of the blue light is reflected, particularly in or at the layer, to the photo-sensor. The photo-sensor generates a photocurrent proportional to the second portion of the first light that is connected a controller. In a preferred embodiment, an amplifier is placed between photo-sensor and controller in order to enhance the photocurrent to increase the measurement accuracy. Preferably, the controller has some intelligence, e.g. CPU, in order to run an algorithm on it to calculate the brightness (second portion of the first light) of each diode. During this procedure the rest of the array of the diodes is turned-off for some microseconds. This procedure is applied to each diode. After that, the colour controller has all the information about the actual brightness (second portion of the first light) of each diode and can adapt the brightness (second portion of the first light) of the diodes in order to get the target colour point. The brightness (second portion of the first light) $b_k$ of the k-th diode can be calculated from the following equation:

$$b_k = c_k i_k$$

where $c_k$ is a constant coefficient, which can be achieved during the calibration procedure, and $i_k$ is the actual value of the photocurrent of the photo-sensor. Preferably, the controller compares the calculated value of each turned-on diode with a default value of each turned-on diode, whereby in case of deviating from the default values, the electrical current supplied to the corresponding diode, is changed in order to equal calculated and default values. According to the invention, no special and expensive colour-sensors are required. An easy adjustment of colours, e.g. warm white, cold white, red, green and blue can be achieved. One of further advantageous is, that a single photo-sensor is used to control all the diodes emitting different colours. Therefore, a temperature caused shift of the photo-sensor properties will not effect the colour point adjustment.

Furthermore, the layer has a thickness n being $10\ \mu m \leqq n \leqq 1$ mm, whereby the layer is connected with the diode by a form fit and/or adhesive bond and/or a frictional connection.

According to another preferred embodiment of the present invention, the substrate comprises a plurality of waveguides, wherein said waveguides guides a second portion of the first visible or invisible light to the photo-sensor. Preferably, each waveguide has a diameter d being $1\ \mu m \leqq d \leqq 10$ mm. In this embodiment the waveguides connect the photo-sensor being in contact with the substrate on his backside, with each light-emitting diode. The waveguides having a certain distance to each other can have a linear structure. Certainly, the waveguides can have further diametric forms, e.g. wavelike or L-shaped form. In such an arrangement, the properties of the photo-sensor are not influenced by the operating temperature of the diodes.

Furthermore, it is preferred that the substrate comprising the waveguides is a one-piece element, whereby the material of the substrate is electrical conductive. According to one possible embodiment of the present invention the material of the substrate can be copper.

Alternatively, a preferred embodiment of the colour point control system according to the invention is characterized in that a transmission filter is placed between the photo-sensor and each diode. It is possible that not only the first visible light of each diode is radiated from each diode to the photo-sensor but also colour-light like red, green or amber light. Because only the first visible light is necessary for getting the information of the brightness of each light-emitting diode, the above-mentioned colour light has to be eliminated. The transmission filter absorbs the colored light in order to sense only the blue part of the radiation spectrum. The filter can comprise different layers, e.g. dielectrically layers. Alternatively, the colour point control system according to the invention can apply an organic filter.

Furthermore, the photo-sensor can be placed between the substrate and the diodes. This placement allows using only one printed circuit board to connect the LEDs and the sensor. In the case of a filter between the photo-sensor and the diodes, the photo-sensor is only sensitive for the first visible light, no waveguides should be used to sense the first visible light of all the LEDs. Only the stray light is used for sensing.

The preferred invention relates to a method for operating a colour point control system according to claim 1, comprising the steps of:

a) operating one single diode during the turn-off time, wherein all the other diodes are turned-off,
b) measuring the second portion of the first light of the single diode during the turn-off time,
d) repeating the steps a) and b) sequentially for all diodes until the second portion of the first light is measured for each single diode.
e) comparing the second portion of the first light of each single diode with the default value and adapting the second portion of first light to the default value.

Preferably, the turn-off time for the said diodes is less than 5 microseconds. One of the advantages of the present invention is, that the procedure of getting the information of the second portion of the first light of each diode by turning off of the rest of the diodes is not visible for the human eye. According to a preferred embodiment a controller compares second portion of the first light of each turned-on diode with a default value of each turned-on diode. In case of deviation from default values the electrical current supplied to the corresponding diode is changed. That means that the controller increases or decreases the electrical current of each diode in such a way that the second portion of the emitted first light of each turned-on diode is nearly the same as the default value of the corresponding diode. Preferably, the increase or decrease of the current is directly applied to the LED. In the case of a color control that is based on constant cycles, e.g. pulse-width-modulation, the correction is preferable applied in the next cycle. The first light can be visible light or ultra violet light.

The colour control system as well as the method mentioned above can be used in a variety of systems amongst them systems being automotive systems, home lighting systems, backlighting systems for displays, ambient lighting systems or shop lighting systems.

Figure 2:
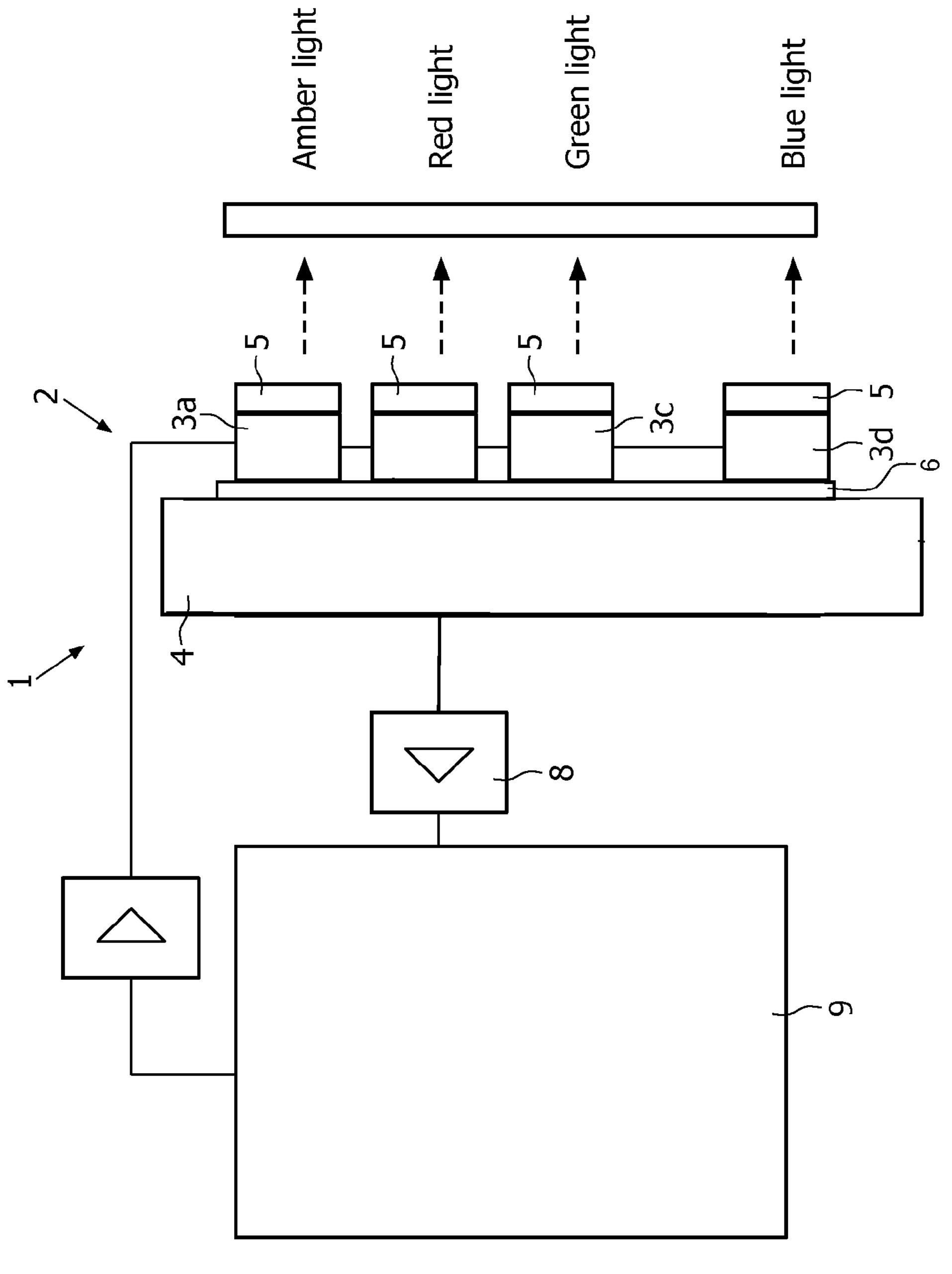

Furthermore, in another embodiment, the photo-sensor can be placed between the substrate and the diodes, as shown in FIG. 2. This placement allows using only one printed circuit board to connect the LEDs and the sensor. In the case of a filter between the photo-sensor and the diodes, the photo-sensor is only sensitive for the first visible light, no waveguides should be used to sense the first visible light of all the LEDs. Only the stray light is used for sensing.

Additional details, characteristics and advantages of the object of the invention are disclosed in the sub-claims and the following description of the respective feature—which is an exemplary fashion—show one preferred embodiment of the colour control system according to the invention.

FIG. 1: schematic view of a colour point control system according to one embodiment of the present invention.

FIG. 2: schematic view of a colour point control system according to another embodiment of the present invention.

Figure 3:
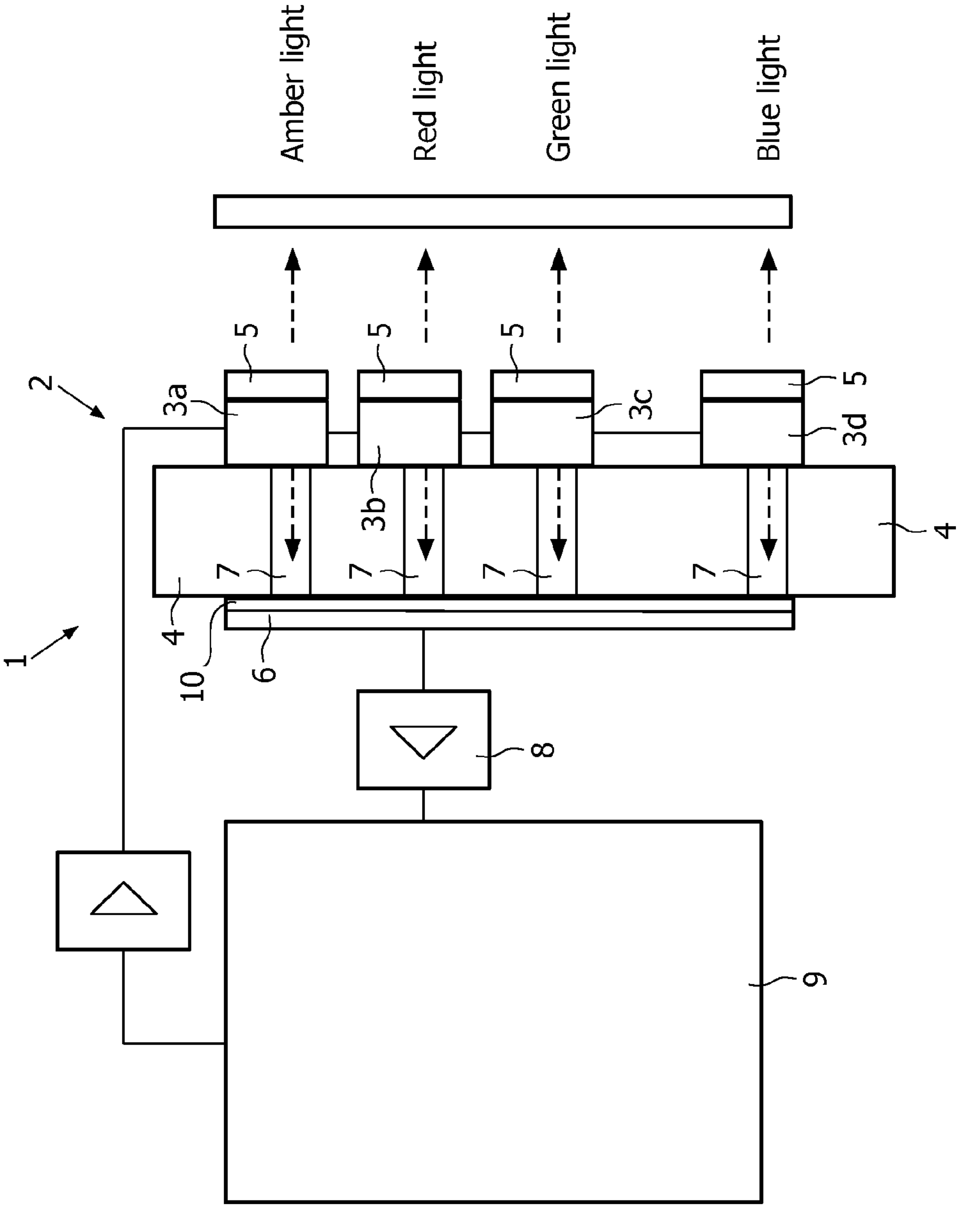

FIG. 3: schematic view of a colour point control system according to yet another embodiment of the present invention.

FIG. 1 shows a very schematic view of a colour point control system 1 according to one embodiment of the present invention. As can be seen the colour point control system 1 comprises a LED device 2 consisting of an area of a plurality of a light-emitting diodes 3*a*, 3*b*, 3*c*, 3*d*, each of the light-emitting diodes (LED) 3*a*,3*b*,3*c*,3*d* are separately controlled by a single driver-line. Each LED 3*a*,3*b*,3*c*,3*d* contains a layer including a fluorescent material. In the shown embodiment the fluorescent material is a phosphor ceramic or a phosphor powder layer. The LED 3*a*, 3*b*, 3*c*, 3*d* emits a first visible light having a maximum intensity in a first spectral range. In the shown embodiment the maximum intensity is at 455 nm (blue light). The layer 5 converts at least the first portion of the first light into the second light, which depends on the kind of fluorescent material. The setup consist of n LEDs emitting blue light and n−1 LEDs with a layer 5 in order to generate other required colours like amber light, red light or green light. The LED 3*d*, which is placed at the bottom of the colour point control system 1, comprises a layer 5 without having a fluorescent material. Thus, blue light is leaving from the LED 3*d* to the right side. In an alternative embodiment, this diode may not include a layer 5. From the above placed LEDs 3*a*, 3*b*, 3*c* converted light is leaving the device 1 to the right side. The thickness of the described layers 5 is less than 1 mm. Each LED 3*a*, 3*b*, 3*c*, 3*d* is fixed on a substrate 4, which is a one-piece element. On the backside of the substrate 4 a photo-sensor 6 is located. In the shown embodiment the photo-sensor 6 is a silicon-sensor.

Furthermore, the substrate 4 consists of n waveguides 7 connecting the photo-sensor 6 with each LED 3*a*, 3*b*, 3*c*, 3*d*. The photo-sensor 6 is connected over an amplifier 8 to a colour controller 9. The colour controller 9 comprises a CPU in order to run an algorithm on it.

In order to get the information of the amount of first light emitted by the k-th diode 3*a*, all other diodes 3*b*, 3*c*, 3*d* are turned-off for a turn-off time lesser than 5 microseconds, which is not visible for the human eye. In the described embodiment the layer 5 of the diode 3*a* is converting at least a portion (first portion) of the blue light into an amber light. A portion of the blue light is radiated back to the left side (second portion of the first light) by reflection. The waveguide 7 guides the second portion of the first light to the photo-sensor 6. The photo-sensor 6 is generating a photocurrent proportional to the second portion of the first light. This procedure is executed for each LED 3*a*, 3*b*, 3*c*, 3*d*. After that, the colour controller 9 calculates the actual value of the second portion of first light from the corresponding photocurrent value for each diode. The controller 9 compares the calculated value of each turned-on diodes 3*a*, 3*b*, 3*c*, 3*d* with a default value of each turned-on diodes 3*a*, 3*b*, 3*c*, 3*d*. In case of deviation from the default value the electrical current supplied to the corresponding diodes 3*a*, 3*b*, 3*c*, 3*d*, is changed in order to equal measured and default values.

For example, the photocurrent generated in the photo-sensor 6 of the diode 3*a* is 8% of the total photocurrent of all diodes and the target photocurrent is 10%, the colour controller 9 detects this difference of 2%. From this information the colour point control system 1 knows that 2% of the colour of the diode 3*a* is missing. Thus, the colour point control system 1 increases the electrical current to the turned-on diode 3*a* till the actual second portion of the first light is as high as required to generate a photocurrent of 10% of the diode 3*a*. This can be achieved increasing the current, e.g. in continuous mode operation, or increasing the duration of the time, the corresponding diode is turned on, e.g. in pulsed mode operation. In the latter mode, also a combination of adapting the current and the on-time duration can be applied. Advantageously, the colour point control system 1 is scalable to an arbitrary amount of LEDs of the arbitrary colours, e.g. 2× red, 2× green, 2× blue and 2× amber. In another embodiment, a said diode can comprise an array of two or more sub-diodes all emitting the same first light operated in parallel by one driving connection. For this, the waveguide has to have branches in order to collect the light from the two or more sub-diodes to the photo-diode in order to achieve one measured value for each single array of sub-diodes. The calibration and colour point control procedure is identical to the above-mentioned procedure.

According to the embodiment of FIG. 1 the colour controller 9 comprises a software applying this described procedure getting the actual value of the second portion of first light of each diode 3*a*, 3*b*, 3*c*, 3*d* and controlling the actual value to a default value.

Surprisingly is has been found out that a transmission filter 10 can be placed between the photo-sensor 6 and each diode 3*a*, 3*b*, 3*c* and 3*d*, as shown in FIG. 3, in order to sense only one part of the radiation spectrum, e.g. the blue part. The transmission filter can comprise different electrical layers. An organic layer is conceivable, too.

Alternatively, the LEDs 3*a*, 3*b*, 3*c*, 3*d* of the described embodiment can emit ultra violet light. In this embodiment, each diode 3*a*, 3*b*, 3*c*, 3*d* comprise a layer 5 including fluorescent material to convert the ultra violet first light into different visible light.

List of Numerals

1 Colour point control system
2 LED device
3 Light-emitting diode, LED
4 Substrate
5 Layer
6 Photo-sensor
7 Waveguide
8 Amplifier
9 Controller

The invention claimed is:

1. Colour point control system comprising an LED device, comprising a plurality of light-emitting diodes for emitting a first light, said diodes fixed on a substrate, a layer of material disposed on at least one light-emitting diode for converting at least a first portion of the first light into a second light, a photo-sensor for measuring a second portion of the first light of each single diode of said plurality of light-emitting diodes during a turn-off time when all other diodes are turned off, wherein the measured second portion of the first light is emitted to the photo-sensor without passing the layer, and a controller for sequentially turning off said diodes and for comparing the second portion of the first light of each single diode measured by the photo-detector to a default value and to adapt the emitted second portion of first light of each single diode to said default value.

2. Colour point control system according to claim 1, wherein the first light is visible light or ultra violet light.

3. Colour point control system according to claim 1, wherein the second light is at least one of the colours red, amber, green and/or blue.

4. Colour point control system according to claim 1, wherein the substrate comprises a plurality of waveguides, wherein said waveguide guides the second portion of the first light to the photo-sensor.

5. Colour point control system according to claim 1, wherein a transmission filter is placed between the photo-sensor and said plurality of diodes.

6. Colour point control system according to claim 1, wherein the substrate (4) is a one-piece element.

7. Colour point control system according to claim 1, wherein the photo-sensor is placed between the substrate and said plurality of diodes.

8. Colour point control system according to claim 1, wherein the photo-sensor is connected to the controller via an amplifier.

9. A method for operating a colour point control system comprising an LED device comprising a plurality of light-emitting diodes for emitting a first light and a layer of material disposed on at least one light-emitting diode of said plurality of light-emitting diodes for converting at least a first portion of the first light into a second light, the method comprising the steps of:

a) operating one single diode of said plurality of light-emitting diodes during a turn-off time, wherein all other diodes of said plurality of light-emitting diodes are turned off, b) measuring a second portion of the first light of the single diode during the turn-off time, d) repeating the steps a) and b) sequentially for all diodes of said plurality of light-emitting diodes until the second portion of the first light is measured for each diode of said plurality of light-emitting diodes; and e) comparing the second portion of the first light of each single diode (3*a*,3*b*,3*c*,3*d*)with a default value and adapting the second portion of first light to the default value.

10. The method as claimed in claim 9, wherein the turn-off time is less than 5 microseconds.

* * * * *